(12) United States Patent
Duran et al.

(10) Patent No.: US 8,875,440 B1
(45) Date of Patent: Nov. 4, 2014

(54) ROTATABLE BARRIER FOR RETAINING A VEHICLE IN A RAILROAD BOXCAR DURING LOADING PROCEDURES

(71) Applicants: Jose Duran, Dixon, CA (US); Antonio Roa, Maxwell, CA (US)

(72) Inventors: Jose Duran, Dixon, CA (US); Antonio Roa, Maxwell, CA (US)

( * ) Notice: Subject to any disclaimer, the term of this patent is extended or adjusted under 35 U.S.C. 154(b) by 0 days.

(21) Appl. No.: 14/034,935

(22) Filed: Sep. 24, 2013

(51) Int. Cl.
*E01D 1/00* (2006.01)
*B61K 13/00* (2006.01)
*E04H 17/14* (2006.01)

(52) U.S. Cl.
CPC ............... *B61K 13/00* (2013.01); *E04H 17/14* (2013.01)
USPC ............... 49/9; 49/34; 49/49; 49/50; 14/71.1; 14/69.5

(58) Field of Classification Search
CPC ............... E06B 11/027; E06B 11/028; E06B 2009/007; E06B 2009/002; B61B 1/02; B61B 1/00
USPC ............ 49/34, 9, 49, 50; 404/6; 14/71.1, 69.5
See application file for complete search history.

(56) References Cited

U.S. PATENT DOCUMENTS

| | | | | |
|---|---|---|---|---|
| 6,751 | A | * | 10/1849 | Torrey ........................... 405/100 |
| 1,837,866 | A | * | 12/1931 | Heldenbrand ................... 104/31 |
| 1,938,675 | A | * | 12/1933 | Young .............................. 405/94 |
| 2,052,867 | A | * | 9/1936 | Cartzdafner et al. ....... 105/406.2 |
| 2,190,708 | A | * | 2/1940 | Fowler ......................... 105/238.1 |
| 3,299,572 | A | * | 1/1967 | Wallace ........................... 49/131 |
| 3,440,673 | A | * | 4/1969 | Kelley ............................ 14/71.3 |
| 3,766,585 | A | * | 10/1973 | Yoon ............................... 14/69.5 |
| 3,806,976 | A | * | 4/1974 | Yoon ............................... 14/71.3 |
| 3,839,824 | A | | 10/1974 | Ellis |
| 3,886,614 | A | * | 6/1975 | Rosengren ..................... 14/71.7 |
| 3,999,397 | A | * | 12/1976 | Albery .......................... 405/218 |
| 4,694,522 | A | * | 9/1987 | Alten ............................. 14/71.1 |
| 5,148,751 | A | * | 9/1992 | Alten et al. ...................... 104/31 |
| 5,372,354 | A | * | 12/1994 | Cacicedo ........................ 256/22 |
| 5,546,703 | A | * | 8/1996 | Conway ......................... 49/197 |
| 5,649,396 | A | | 7/1997 | Carr |
| 6,497,076 | B1 | | 12/2002 | van de Wiel |
| 6,837,296 | B2 | | 1/2005 | Kimener |
| 7,305,730 | B1 | | 12/2007 | Vait |
| 2009/0278105 | A1 | * | 11/2009 | McIlwain .................... 256/65.02 |
| 2012/0305363 | A1 | * | 12/2012 | Smith ............................ 198/360 |

FOREIGN PATENT DOCUMENTS

GB 2232707 A * 12/1990 ............. E06B 11/02

* cited by examiner

*Primary Examiner* — Katherine Mitchell
*Assistant Examiner* — Marcus Menezes (57) ABSTRACT

The present invention is a safety barrier for providing safety to forklifts while loading boxcars. The safety barrier includes a stationary structure attached to a barrier structure via a linking structure. The stationary structure comprises a number of bollards and the linking structure comprises a first portion and a second portion for attaching to the bollards. The barrier structure comprises a barrier end mounted to the linking structure by way of support posts, a pair of weighted ends attached to the linking structure by way of support posts. The barrier structure is rotatably mounted upon the linking structure such that barrier structure articulates between a deployed position and a non-deployed position to ensure safety to forklifts during loading procedures.

20 Claims, 8 Drawing Sheets

ROTATABLE BARRIER FOR RETAINING A VEHICLE IN A RAILROAD BOXCAR DURING LOADING PROCEDURES

CROSS-REFERENCE TO RELATED APPLICATIONS

Not Applicable.

STATEMENT REGARDING FEDERALLY SPONSORED RESEARCH AND DEVELOPMENT

Not Applicable.

TECHNICAL FIELD

This invention relates to the field of safety barriers and, more particularly, to a deployable safety barrier that prevents forklifts from incurring damage and accidents while loading and unloading boxcars.

DISCUSSION OF RELATED ART

Loading docks are a hub of activity in commercial buildings, industrial buildings, warehouses and distribution centers. A loading dock is a recessed bay in a facility where trucks are loaded and unloaded. Loading docks typically include a door for providing access between the dock and building, and bumpers to protect the dock from truck damage while loading and unloading of trucks. Loading docks have an increased potential for serious injury, resulting from hazards such as forklifts overturning, slips, trips and falls, trailer creep, material handling injuries etc, which in turn result in huge expenses. Stand-alone safety barriers are used to prevent damage caused during loading procedures. Conventional safety barriers have considerable drawbacks, principally being that they require additional components and modifications to the building structure to incorporate the barrier.

U.S. Pat. No. 7,305,730 issued to Vait on Dec. 11, 2007 provides a freight loading bumper system that protects the area of a dock on a warehouse from unnecessary damage by trailers, forklifts and the like. The bumper system comprises a front plate having an outer surface and an inner surface and a plurality of holes, a bumper mounted to the front plate, a plurality of side plates connected to the front plate, a gusset plate, a top closure plate, means to secure the bumper system to a loading dock, the means to secure comprising a vertical hinge plate and a loading dock plate, a horizontal hinge plate secured to the vertical hinge plate, via a hinge pin. The device is secured to the front of a loading dock and includes a rubber bumper to absorb the shock. The device is hinged to allow rotation for necessary repair and maintenance. However, the method of installing the bumper system is complex and hence cannot be easily employed by the user.

U.S. Pat. No. 6,837,296 issued to Kimener on Jan. 4, 2005 reveals a safety barrier assembly for protecting an edge of a loading platform. The safety barrier assembly includes a gate reciprocating between a barrier position approximate an edge of a loading platform and an open position away from the edge of the loading platform, and a toe barrier mounted approximate the edge of the loading platform and operatively coupled to the primary gate to reciprocate between a barrier position and an open position. The toe barrier provides a vertical barrier along a floor of the loading platform approximate the edge of the loading platform in its barrier position, and is operative to reciprocate to its barrier position when the primary gate is in its barrier position and to reciprocate to its open position when the primary gate is in its open position. The safety barrier assembly thus described herein requires additional components for installation.

U.S. Pat. No. 6,497,076 issued to van de Wiel, et al. on Dec. 24, 2002 discloses a bumper assembly for a loading dock which includes a bumper that is moveable between an operative position and a stored position. In the operative position, the bumper extends well above the dock platform to prevent excessively high trucks, trailer beds, and cargo containers from being parked over the top of the dock platform. In the stored position, the bumper is positioned so as not to obstruct loading and unloading of cargo. Such a device is difficult to operate and hence cannot be easily employed in a manner similar to the present invention.

One prior art device, taught in U.S. Pat. No. 5,649,396 issued to Carr on Jul. 22, 1997 provides a loading dock safety barrier for use across a vehicle passageway to prevent accidentally driving a vehicle off the end of the loading dock. A barrier mount is attached to a guidepost inside the loading dock doorway and is horizontally rotatable about a vertical axis. A rigid barrier arm is rotatably affixed to the barrier mount so that the barrier arm raises and lowers vertically in a semaphore arm fashion. The barrier arm is typically constructed from an I-beam or box beam and is of sufficient strength to resist vehicle impact. A receiving rest is attached to an opposite guidepost inside the loading dock doorway and is horizontally rotatable about a vertical axis and positioned to receive the free end of the barrier arm. The receiving rest has locking means on the receiving rest to lock the free end of the barrier arm in the receiving rest so that upon vehicle impact with the barrier arm deformation of the barrier arm and rotation of the barrier mount and receiving rest about their respective vertical rotation axes occurs while retaining the barrier arm in a locked relationship with the receiving rest. However, the barrier is in need of a U-bolt and pair of nuts for providing a clamping force on the guidepost for permitting the rotation of the barrier mount about the guidepost.

U.S. Pat. No. 3,839,824 issued to Ellis on Oct. 8, 1974 discloses a removable safety guard for loading docks, platforms and the like. The opposite ends of a flexible plastic cable are attached to an enclosed spring-loaded reel in which they are retracted when not in use. The reel enclosure is mounted on a main post disposed adjacent to one side of the protected area. A cable pull is used to unwind the cable from the reel and attach it to a terminal post disposed adjacent to the other side of the protected area. The cable provides two vertically spaced lengths of cable extending across the protected area. For larger widths, a removable intermediate post may be used. Such a device includes an additional reel enclosure to be installed on the main post for mounting reel.

In addition, it must be mentioned that the prior art has not adequately addressed the field of providing safety barriers during the process of loading and unloading railroad boxcars. Loading docks are set up at track side to run level with the entry of a box car and thereby allow forklifts to drive in and out of a box car during loading and unloading. Typically, a box car has sliding entry doors on either side of the box car to allow it to be loaded or unloaded from different sides. During forklift loading, it is common practice to open both doors to allow the forklift entry on the loading dock side and to simultaneously allow the forklift an added measure of space on the opposite side to maneuver. The door opposite the loading dock presents a deadfall for the forklift and forklift operator should the forklift over-maneuver. Without a barrier on the boxcar's side opposite the loading dock, there is nothing preventing accidents during boxcar loading.

Therefore, there is a need for a device for preventing damage to forklifts and forklift operators resulting from the deadfall hazard presented by an open door opposite the loading dock while loading and unloading boxcars. The present invention accomplishes these objectives.

SUMMARY OF THE INVENTION

The present invention is a safety barrier for providing safety to forklifts while loading boxcars. The safety barrier includes a stationary structure positioned on a track side and a barrier structure attached to the stationary structure via a linking structure. The stationary structure comprises a plurality of bollards wherein each of the plurality of bollards comprises a vertical post and a foundation. The linking structure comprises a first portion and a second portion for attaching the plurality of bollards to the barrier structure. The barrier structure comprises a barrier end mounted to the linking structure by way of a plurality of support posts and attachment means, a pair of weighted ends attached to the linking structure by means of a plurality of support posts and attachment means and a safety locking pin positioned on the linking structure to lock the barrier structure in position. The barrier structure is rotatably mounted upon the linking structure in such a way that the barrier structure articulates between a deployed position and a non-deployed position to ensure safety to forklifts during loading procedures. The barrier structure is arranged in such a way that the barrier structure rotates about a horizontal axis between the deployed position and the non-deployed position.

The stationary structure includes the plurality of bollards, which can be attached to the barrier structure. The barrier end and the pair of weighted ends are mounted to the linking structure. The first portion and the second portion of the linking structure includes a first connecting member and a second connecting member. The plurality of bollards includes a first bollard, a second bollard and a third bollard. The vertical post of the first bollard includes a right arm, which is attached to the first connecting member of the first portion of the linking structure. The vertical post of the second bollard includes a left arm and a right arm. The left arm is attached to the second connecting member of the first portion and the right arm is attached to the first connecting member of the second portion of the linking structure. The vertical post of the third bollard includes a left arm, which can be attached to the second connecting member of the second portion of the linking structure. The first portion, the second portion, the first connecting member, the second connecting member and the plurality of bollards are joined together by a securing means.

The present invention also discloses a method for providing safety to forklifts while loading boxcars. Initially, the safety barrier comprising a stationary structure, a linking structure and a barrier structure is mounted at a trackside opposite a loading dock and the safety barrier is placed in position. The safety locking pin positioned on the safety barrier is then removed. Next, the barrier structure is rotated to a horizontal orientation to achieve a deployed position. The barrier structure is then allowed to settle at a sufficient height above the boxcar floor in the deployed position. Once in the deployed position, the safety locking pin is locked by means of an engaging chain and lock to maintain the barrier structure in the deployed position. Then, the correct position of the safety barrier and the safety locking pin is ensured. Finally, a loading procedure is initiated to allow the forklift to move into the safety barrier and be retained within a boxcar.

DETAILED DESCRIPTION OF THE PREFERRED EMBODIMENT

Figure 1:
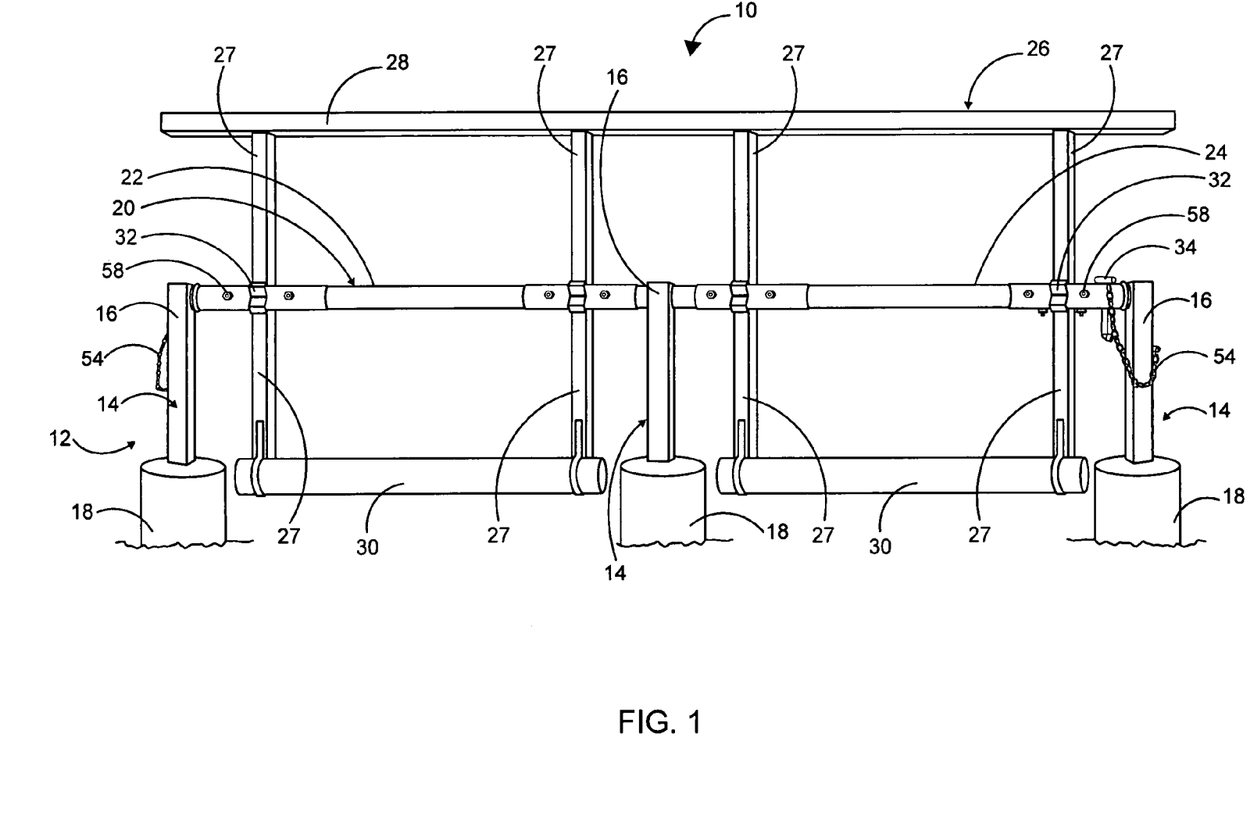
FIG. 1 is a perspective view of a safety barrier of the present invention, illustrating the safety barrier in non-deployed position.

Referring now specifically to the drawings, FIG. 1 shows a safety barrier 10 of the present invention for providing safety to forklifts while loading boxcars. The safety barrier 10 includes a stationary structure 12 positioned on a track side (not shown in this view) and a barrier structure 26 attached to the stationary structure 12 via a linking structure 20. The stationary structure 12 comprises a plurality of bollards 14, wherein each of the plurality of bollards 14 comprises a vertical post 16 and a foundation 18. The linking structure comprises a first portion 22 and a second portion 24 for attaching the plurality of bollards 14. The barrier structure 26 comprises a barrier end 28 rotatably mounted to the linking structure 20 by way of a plurality of support posts 27, a pair of weighted ends 30 attached to the barrier end 28 by means of the plurality of support posts 27 and rotatably mounted to the linking structure 20 by way of a plurality of attachment means 32, a safety locking pin 34 positioned on the linking structure 20 to lock the safety barrier 10 in position. The barrier structure 26 is mounted upon the linking structure 20 in such a way that the barrier structure 26 rotates in relation to the stationary structure 12 and articulates between a deployed position and a non-deployed position to ensure safety to forklifts during loading procedures.

Figure 2:
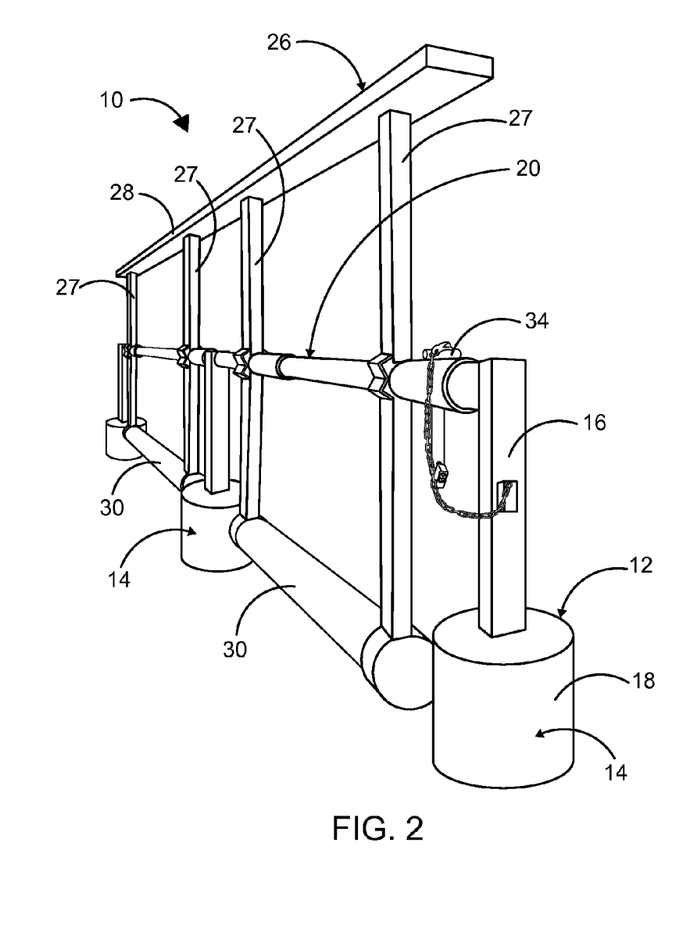
FIG. 2 is a side perspective view of the safety barrier of the present invention.

As shown in FIG. 2, a side perspective view of the safety barrier 10 of the present invention is illustrated. The barrier end 28 and the pair of weighted ends 30 are connected by means of a plurality of support posts 27. The safety barrier 10 is rotated to 90-degree upright orientation in the non-deployed position. In this non-deployed position, when the safety barrier 10 is not in use, the safety barrier 10 can be rotated to its 90-degree upright orientation and the safety locking pin 34 can be locked to prevent the safety barrier 10 from moving.

Figure 3:
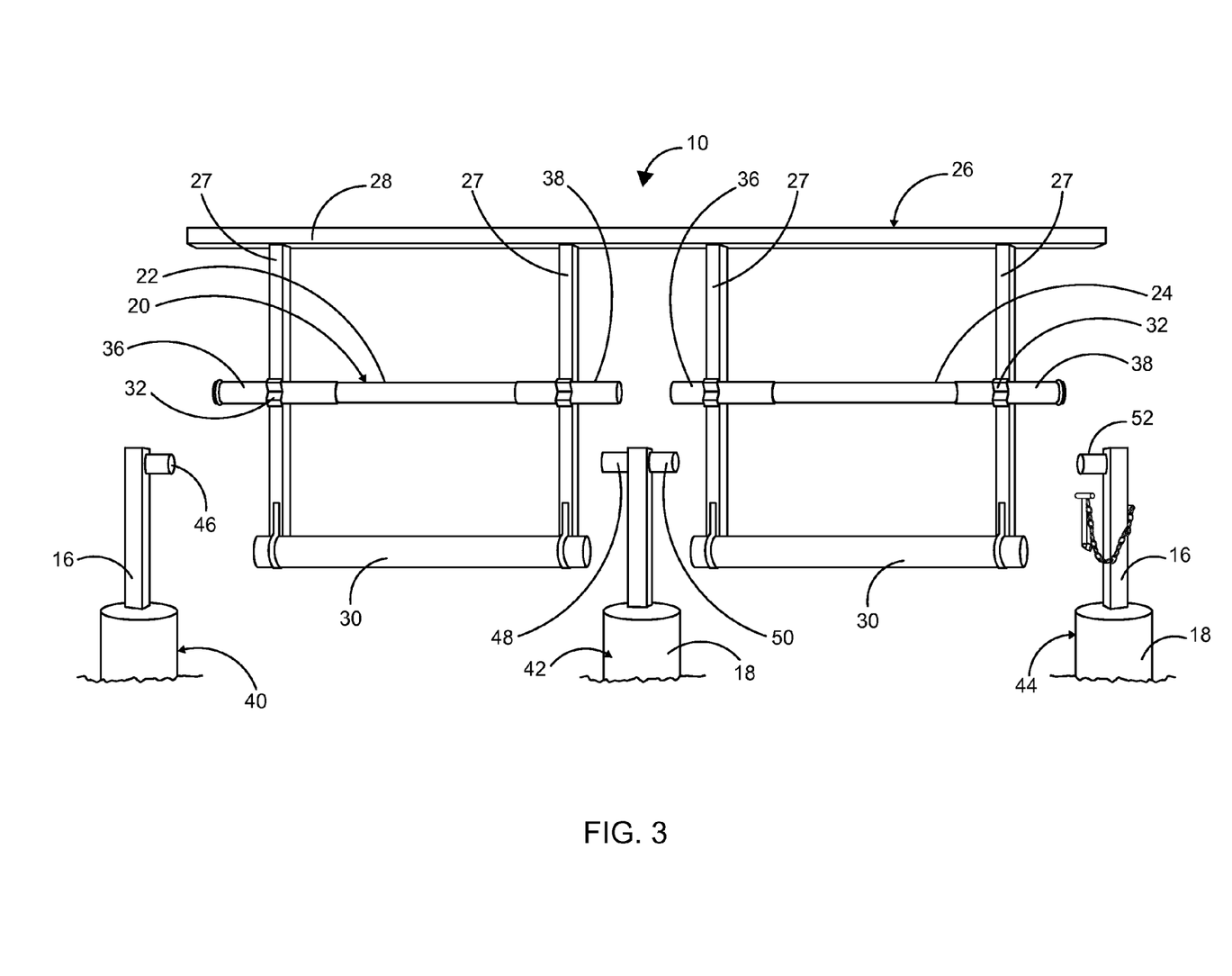
FIG. 3 is an exploded view of the safety barrier, illustrating a stationary structure separated from a barrier structure.

FIG. 3 illustrates an exploded view of the safety barrier 10, illustrating the stationary structure 12 separated from the barrier structure 26. The stationary structure 12 includes the plurality of bollards 14, which can be attached to the barrier structure 26. The barrier end 28 and the pair of weighted ends 30 are mounted to the linking structure 20 via the plurality of posts 27. The first portion 22 and the second portion 24 of the linking structure 20 includes a first connecting member 36 and a second connecting member 38. The plurality of bollards 14 includes a first bollard 40, a second bollard 42 and a third bollard 44. The vertical post 16 of the first bollard 40 includes a right arm 46, which is attached to the first connecting member 36 of the first portion 22 of the linking structure 20. The vertical post 16 of the second bollard 42 includes a left arm 48 and a right arm 50. The left arm 48 is attached to the second connecting member 38 of the first portion 22 and the right arm 50 is attached to the first connecting member 36 of the second portion of the linking structure 24. The vertical post 16 of the third bollard 44 includes a left arm 52, which can be attached to the second connecting member 38 of the second portion 24 of the linking structure 20. The first portion 22, the second portion 24, the first connecting member 36, the second connecting member 38 and the plurality of bollards 14 are joined together by a securing means 58. The securing means 58 is selected from a group consisting of: nuts and bolts.

Figure 4:
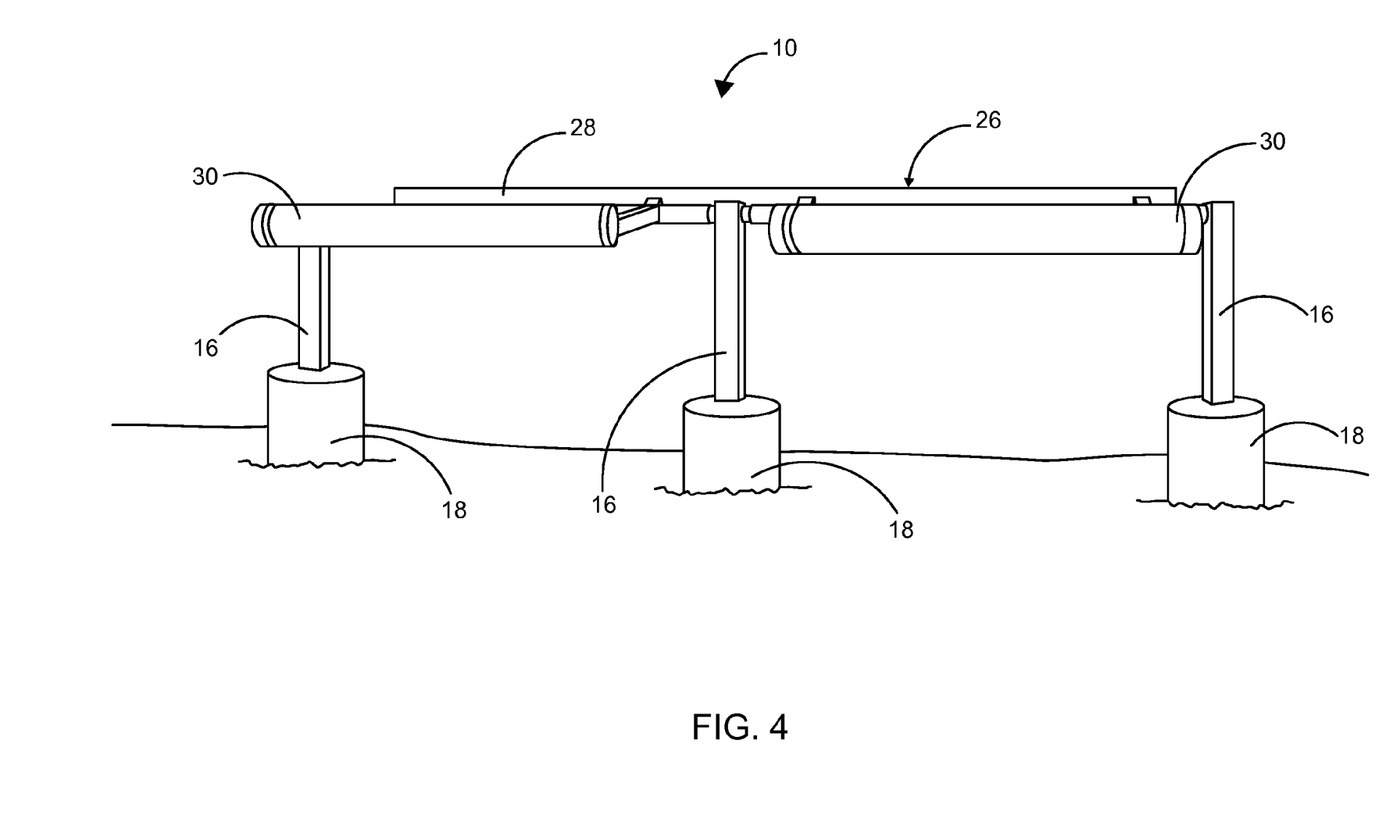
FIG. 4 is a perspective view of the safety barrier, illustrating the safety barrier in deployed position.

FIG. 4 illustrates the safety barrier 10 in deployed position. In this position, the safety barrier 10 rests at horizontal orientation. The safety locking pin 34 is removed from the linking structure 20 to bring the safety barrier 10 to horizontal orientation for loading procedures. The barrier structure 26 is then allowed to settle at a sufficient height above boxcar floor in this deployed position, so as to allow a forklift to be retained within a boxcar. The barrier structure 26 is arranged in such a way that the barrier structure 26 rotates about a horizontal axis between the deployed position and the non-deployed position (FIGS. 1 and 2).

Figure 5:
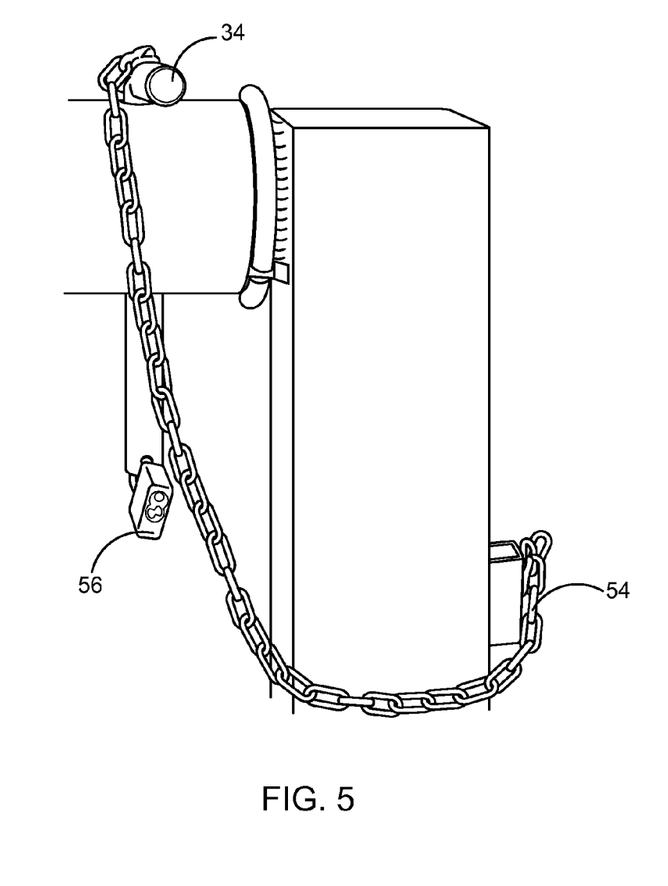
FIG. 5 is a perspective view of the safety barrier, illustrating a safety locking pin locked by means of an engaging chain and lock.

As shown in FIG. 5, the safety locking pin 34 is locked in position by means of an engaging chain 54 and a lock 56. The safety locking pin 34 is positioned on the second portion 24 of the linking structure 20. In the non-deployed position (FIGS. 1 and 2), the safety locking pin 34 positioned on the second portion of the linking structure 24 is locked to the vertical post 16 of the third bollard 44 by means of the engaging chain 54 and the lock 56. While, in the deployed position, the safety locking pin 34 is initially removed and the barrier structure 26 is allowed to rotate to a horizontal orientation. When the barrier structure 26 settles at a sufficient height above a boxcar floor in the deployed position, the safety locking pin 34 is locked to maintain the barrier structure 26 in position. Additionally, the safety barrier 10 can include a safety locking 34 positioned on the first portion of the linking structure 22 which can be locked to the vertical post 18 of the first bollard 40 by means of the engaging chain 54 and the lock 56.

Figure 6:
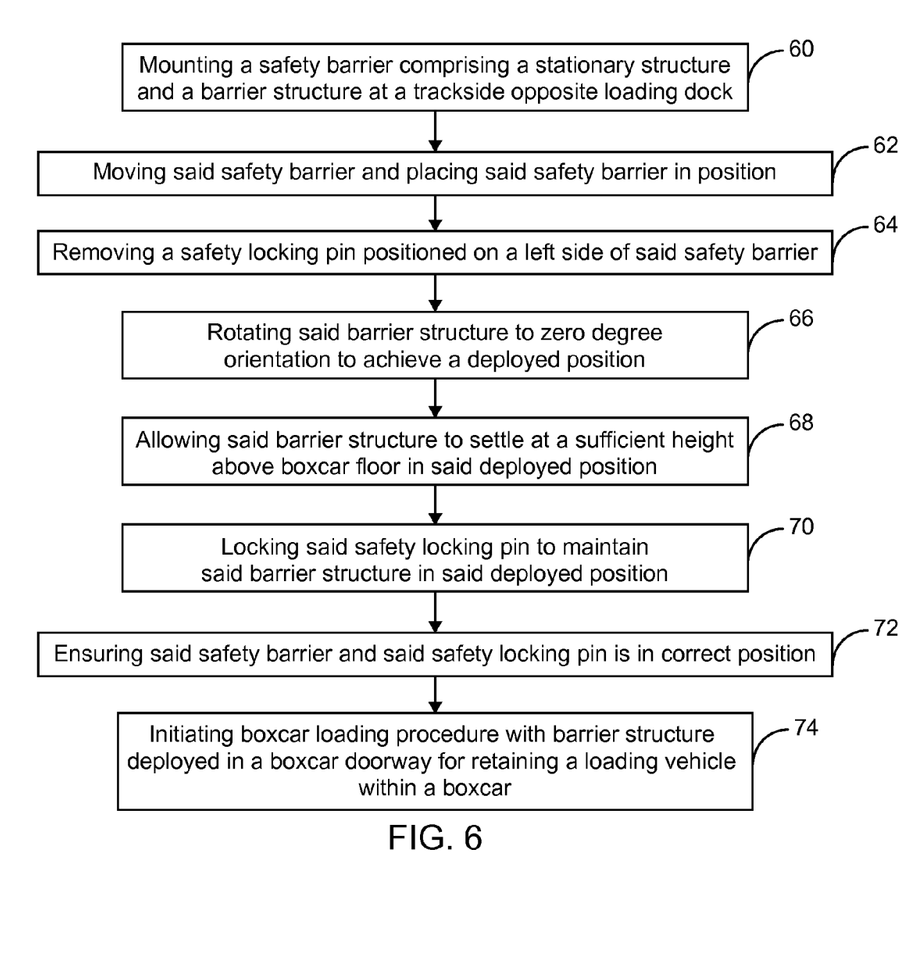
FIG. 6 is a flowchart of the present invention, illustrating a method for providing safety to forklifts while loading boxcars.

FIG. 6 illustrates a method for providing safety to forklifts while loading boxcars. Initially, the safety barrier comprising a stationary structure, a linking structure and a barrier structure is mounted at a trackside opposite a loading dock as shown in block 60. Then, the safety barrier is moved and placed in position as indicated at block 62. The safety locking pin positioned on the safety barrier is then removed as shown in block 64. Next, as indicated at block 66, the barrier structure is rotated to a horizontal orientation (zero degree) to achieve a deployed position. The barrier structure is then allowed to settle at a sufficient height above boxcar floor in the deployed position as shown in block 68. Once in the deployed position, the safety locking pin is locked to maintain the barrier structure in the deployed position as indicated at block 70. Then, the correct position of the safety barrier and the safety locking pin is ensured as shown in block 72. Finally, as indicated at block 74, the loading procedure is initiated with the barrier structure deployed in an open boxcar door a sufficient height above a boxcar floor on a side of the boxcar wherein a deadfall hazard is evident. Generally, a deadfall hazard is presented by an open door on a side of a boxcar that is opposite a loading dock side of the boxcar. The barrier structure, being deployed a sufficient height above a boxcar floor operates to retain a loading vehicle, such as a forklift, within the boxcar.

Figure 7:
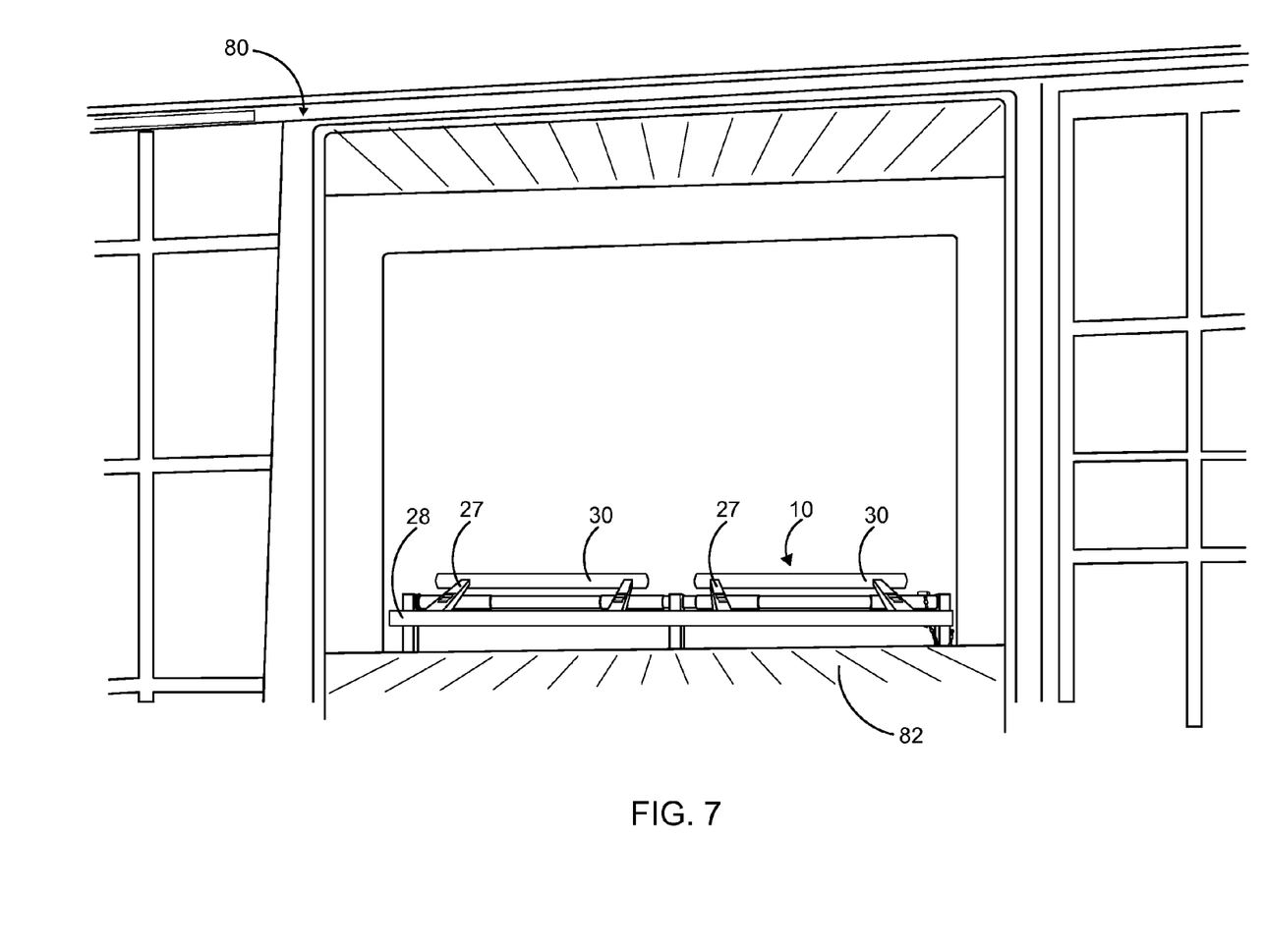
FIG. 7 is a perspective view of the present invention, illustrating the safety barrier positioned outside a boxcar in the deployed position.
Figure 8:
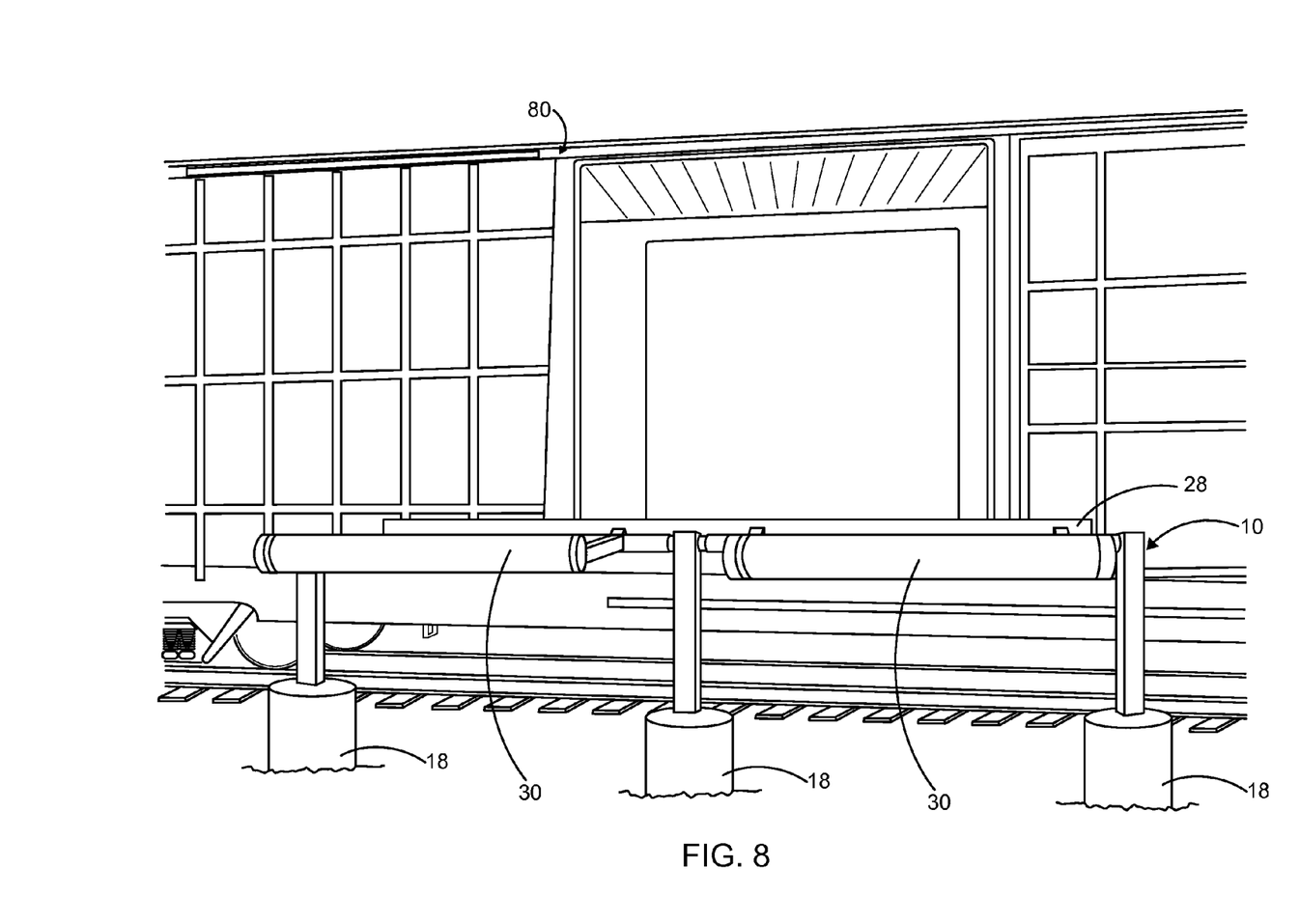
FIG. 8 is a perspective view of the present invention, illustrating the safety barrier mounted outside the boxcar in the deployed position.

FIGS. 7-8 illustrate perspective views of the present invention, illustrating the safety barrier 10 positioned outside a boxcar 80 in the deployed position. As shown in FIG. 7, a perspective view of the safety barrier 10 from inside the boxcar 80 is illustrated. FIG. 8 illustrates a perspective view of the safety barrier 10 from outside the boxcar 80. As shown in FIGS. 7-8, the safety barrier 10 is positioned in the deployed position while loading the boxcars. In this position, the safety barrier 10 rests at a horizontal orientation. The safety locking pin 34 is removed from the linking structure 20 to bring the safety barrier 10 to a horizontal orientation for loading procedures. The barrier structure 26 is then allowed to settle at a sufficient height above the boxcar floor 82 in this deployed position, so as to allow the forklift to move into the safety barrier 10 and be retained within the boxcar 80.

The safety barrier 10 of the present invention can be adapted for usage as a trackside barrier which can be deployed and un-deployed in a rotatable manner to protect a forklift from falling while loading and unloading of boxcars. The safety barrier 10 is mounted on the trackside opposite a loading dock and can be easily installed on the trackside. Furthermore, the safety barrier 10 can be widely employed in commercial buildings, industrial buildings, warehouses and distribution centers for safe loading and unloading of trucks.

Finally, although the description above contains many specificities, these should not be construed as limiting the scope of the invention, but as merely providing illustrations of some of the presently preferred embodiments of this invention. For example, this invention may be altered and rearranged in numerous ways by one skilled in the art without departing from the coverage of any patent claims which are supported by this specification.

The invention claimed is:

1. A safety barrier for providing safety to forklifts while loading and unloading boxcars, said safety barrier comprising:
   a stationary structure positioned on a railroad track side opposite a loading dock, said stationary structure comprising:
   a plurality of bollards, each of said plurality of bollards comprising a vertical post and a foundation;
   said safety barrier further comprising a linking structure attached to said plurality of bollards, said linking structure comprising a first portion and a second portion; and
   a barrier structure attached to said stationary structure via said linking structure, said barrier structure comprising:
   a barrier end rotatably mounted to said linking structure by way of a plurality of support posts;
   a pair of weighted ends attached to said linking structure by means of said plurality of support posts; and
   a safety locking pin positioned on said linking structure to lock said barrier structure in a deployed position or a non-deployed position;
   whereby said barrier structure articulates rotatably between said deployed position and said non-deployed position to ensure safety to forklifts during loading and unloading procedures, wherein said safety locking pin is removed from said linking structure to bring said safety barrier to a horizontal orientation in said deployed position for loading and unloading procedures.

2. The safety barrier as recited in claim 1, wherein said barrier structure rotates about a horizontal axis between said deployed position and said non-deployed position.

3. The safety barrier as recited in claim 1, wherein said barrier structure is rotated to a vertical orientation in said non-deployed position.

4. The safety barrier as recited in claim 1, wherein said safety locking pin is locked to the second portion of the linking structure to prevent said safety barrier from moving from said non-deployed position.

5. The safety barrier as recited in claim 1, wherein said safety barrier adopts a horizontal orientation in said deployed position.

6. The safety barrier as recited in claim 1, wherein said barrier structure settles at a sufficient height above a boxcar floor in said deployed position so as to allow a forklift to be retained within said boxcar.

7. The safety barrier as recited in claim 1, wherein said first portion and said second portion of said linking structure includes a first connecting member and a second connecting member.

8. The safety barrier as recited in claim 7, wherein said plurality of bollards include a first bollard, a second bollard and a third bollard.

9. The safety barrier as recited in claim 8, wherein said vertical post of said first bollard includes a right arm attached to said first connecting member of said first portion of said linking structure.

10. The safety barrier as recited in claim 8, wherein said vertical post of said second bollard includes a left arm and a right arm.

11. The safety barrier as recited in claim 8, wherein said vertical post of said third bollard includes a left arm attached to said second connecting member of said second portion of said linking structure.

12. The safety barrier as recited in claim 7, wherein said first portion, said second portion, said first connecting member, said second connecting member and the plurality of bollards are joined together by a securing means.

13. The safety barrier as recited in claim 12, wherein said securing means is selected from a group consisting of nuts and bolts.

14. The safety barrier as recited in claim 1, wherein said plurality of support posts are secured to said linking structure by way of a plurality of attachment means.

15. The safety barrier as recited in claim 1, wherein said safety locking pin is locked in position by means of a chain and lock.

16. A method for providing safety to forklifts while loading and unloading boxcars, the method comprising:
 (a) mounting a safety barrier at a trackside opposite a loading dock, said safety barrier comprising a stationary structure, a linking structure and a barrier structure;
 (b) removing a safety locking pin positioned in said linking structure of said safety barrier;
 (c) moving said barrier structure and placing said barrier structure in a vertical orientation to achieve a non-deployed position;
 (d) rotating said barrier structure to a horizontal orientation to achieve a deployed position;
 (e) allowing said barrier structure to settle at a height above a boxcar floor in said deployed position;
 (f) locking said safety locking pin into said linking structure to maintain said barrier structure in said deployed position;
 (g) ensuring said safety barrier and said safety locking pin are in correct position; and
 (h) initiating a loading procedure for loading and unloading boxcars while allowing a forklift to move into contact with said safety barrier and be retained within a boxcar.

17. The method as recited in claim 16, wherein said barrier structure rests at a horizontal orientation in said deployed position.

18. The method as recited in claim 16, wherein said barrier structure settles at a height above a boxcar floor in said deployed position so as to allow said forklift to be retained within said boxcar.

19. The method as recited in claim 16, wherein said barrier structure is allowed to rotate about a horizontal axis between said deployed position and a non-deployed position.

20. The method as recited in claim 16, wherein said safety locking pin is locked in position by means of a chain and lock.

\* \* \* \* \*